United States Patent [19]

Shinomiya

[11] Patent Number: 4,832,415
[45] Date of Patent: May 23, 1989

[54] WHEEL SPEED CONTROL ARRANGEMENT

[75] Inventor: Takashi Shinomiya, Itami, Japan

[73] Assignee: Sumitomo Electric Industries, Ltd., Osaka, Japan

[21] Appl. No.: 202,333

[22] Filed: Jun. 6, 1988

[30] Foreign Application Priority Data

Jun. 4, 1987 [JP] Japan .................................. 62-140302

[51] Int. Cl.[4] .............................................. B60T 8/58
[52] U.S. Cl. ................................. 303/100; 188/181 R; 303/103; 303/110; 364/426.02
[58] Field of Search ...................... 303/91, 93, 95–96, 303/98, 100–111, 113; 364/426; 188/181 A, 181 R, 181 C

[56] References Cited

U.S. PATENT DOCUMENTS

| 3,953,080 | 4/1976 | Bremer | 303/107 |
|---|---|---|---|
| 4,033,634 | 7/1977 | Arai et al. | 303/103 |
| 4,094,556 | 6/1978 | Okamoto et al. | 303/109 |
| 4,135,769 | 1/1979 | Williams et al. | 303/110 X |
| 4,223,957 | 9/1980 | Brearley et al. | 303/110 X |
| 4,230,376 | 10/1980 | Brearley et al. | 303/110 X |
| 4,320,460 | 3/1982 | Brearley et al. | 303/110 X |
| 4,566,737 | 1/1986 | Masaki et al. | 303/96 X |
| 4,637,663 | 1/1987 | Matsuda | 303/106 |
| 4,651,281 | 3/1987 | Masaki et al. | 303/103 X |
| 4,660,896 | 4/1987 | Matsuda | 303/106 |
| 4,662,686 | 5/1987 | Matsuda | 303/106 |
| 4,664,453 | 5/1987 | Kada et al. | 303/100 |
| 4,665,490 | 5/1987 | Masaki et al. | 303/110 X |
| 4,717,209 | 1/1988 | Hagiya et al. | 303/110 X |
| 4,743,074 | 5/1988 | Inoue | 303/113 X |
| 4,748,564 | 5/1988 | Matsuda | 303/103 X |
| 4,755,946 | 7/1988 | Lin | 303/100 X |
| 4,763,960 | 8/1988 | Uchida et al. | 303/100 X |
| 4,778,223 | 10/1988 | Inoue | 303/93 X |

Primary Examiner—Douglas C. Butler
Attorney, Agent, or Firm—Cushman, Darby & Cushman

[57] ABSTRACT

A wheel speed control arrangement for an anti-lock braking system of a motor vehicle, in which a pressure increasing rate is adapted to be varied according to difference values $\Delta V$ of an estimated vehicle body speed V when pressure application is required, whereby it becomes possible to effectively prevent deterioration in the feeling of riding during braking on the road liable to cause slippage, while advantageously avoiding the locking of wheels. On the other hand, on the road difficult to cause slippage, insufficient speed reduction is positively eliminated, thus enabling the braking distance to be suppressed to the minimum.

3 Claims, 3 Drawing Sheets

WHEEL SPEED CONTROL ARRANGEMENT

BACKGROUND OF THE INVENTION

The present invention generally relates to a speed controller and more particularly, to a wheel speed control arrangement in an anti-lock braking system for avoiding locking of wheels during braking of a vehicle such as a motor vehicle or the like.

In a conventional anti-lock braking system as referred to above, it is generally so arranged that excessive slippage of wheels is detected through comparison between a value of a control variable calculated from a slip speed of each wheel or a differential value thereof and a predetermined threshold value, and the locking is avoided through control of the wheel speed by increasing or decreasing the brake hydraulic pressure based on the result of the comparison, while, with respect to the wheels recovered from the sign of locking, pressure is applied at a fixed rate possessed by a brake hydraulic pressure control actuator.

In the practice for effecting the anti-lock control through comparison between the control variable based on the wheel slip speed and differential value thereof and the predetermined threshold value as in the conventional anti-lock braking system described above, although the sign of locking may be effectively detected, it is difficult to detect the state of excessively small slip speed which occurs due to insufficient braking force under a state where the wheel speed becomes generally equal to the vehicle body speed, after recovery of the wheel from the sign of locking. Therefore, in order to preliminarily prevent occurrence of such inconveniences as vibrations of the vehicle body or prolonged braking distance due to falling of the wheel speed reduction below a predetermined value, which may take place as a result of the above disadvantage, it has been a conventional practice to set the pressure increasing rate of the brake hydraulic pressure control actuator to be rather large.

However, when the pressure increasing rate for the brake hydraulic pressure control actuator is set to be rather large as described above, even if the pressure reduction is effected to avoid the sign of locking upon application of a quick braking on a slippery road surface, such sign of locking soon appears again due to the large pressure increasing rate, and consequently, the control cycle is extremely shortened so as to frequently repeat the pressure increase and pressure reduction, thus resulting in uncomfortable feeling of the riding of the vehicle.

SUMMARY OF THE INVENTION

Accordingly, an essential object of the present invention is to provide a wheel speed control arrangement in which a pressure increasing rate is adapted to be varied according to difference values of an estimated vehicle body speed when pressure application is required, with substantial elimination of disadvantage inherent in the conventional arrangements of this kind.

Another object of the present invention is to provide a wheel speed control arrangement of the above described type which is simple in construction and stable in functioning, and can be readily incorporated in an anti-lock braking system at low cost.

In accomplishing these and other objects, according to one preferred embodiment of the present invention, there is proposed, as shown in FIG. 1, a wheel speed control arrangement which includes an estimated vehicle body speed calculator 12 for calculating an estimated vehicle body speed V based on an output Vi of a wheel speed detector 2i for detecting speed of each wheel, a wheel speed differentiator 11i which generates a differential output Di of the output Vi of said wheel speed detector 2i, a wheel slip speed calculator 13i which calculates a slip speed Si of each wheel based on the output V of said estimated vehicle body speed calculator 12 and the output of said wheel speed detector 2i for output, and a brake hydraulic pressure controller 16 which calculates control variables through input of the output Di of said wheel speed differentiator 11a and the output Si of said wheel slip speed calculator 13i so as to control brake hydraulic pressures of the respective wheels through a brake hydraulic pressure control actuator 3 based on results of said calculation, and is characterized in that there is further provided a difference value calculator 14 for calculating a difference value $\Delta V$ of said estimated vehicle body speed V, with the difference value $\Delta V$ being arranged to be applied to said brake hydraulic pressure controller 16 for the calculation of said control variables.

In the wheel speed control arrangement of the present invention having the construction as described above, based on the output Vi (wheel speed) of the wheel speed detector 2i, the differential value Di (wheel speed reduction) thereof and the estimated vehicle body speed V are calculated, while from said estimated vehicle body speed V and the wheel speed Vi, the slip speed Si and the difference value $\Delta V$ of the estimated vehicle body speed V are computed. The brake hydraulic pressure controller 16 detects the sign of locking and the process of recovery of the wheels based on the wheel speed reduction Di, slip speed Si, and the speed variables calculated through employment of the differential value $\Delta V$ of the estimated vehicle body speed as obtained in the above described manner, thereby to effect the control for increasing and decreasing the brake hydraulic pressure by the brake hydraulic pressure control actuator.

In the above case, the difference value $\Delta V$ of the estimated vehicle body speed is used as the data for judging whether a road on which the vehicle is running at that time is easy to cause slippage (small $\Delta V$) or difficult to cause slippage (large $\Delta V$), and when the difference value $\Delta V$ is large, the brake hydraulic pressure controller 16 increases the pressure increasing rate of the brake hydraulic pressure control actuator 3 so as to eliminate the state of insufficient speed reduction, while when the difference value $\Delta V$ is small, deterioration in the feeling of riding is prevented by decreasing the pressure increasing rate. It is to be noted here that the pressure increasing rate of the brake hydraulic pressure control actuator 3 may be set in more than three kinds according to the difference values of the estimated vehicle body speed, and that immediately before the braking, since the difference value $\Delta V$ of the estimated vehicle body speed becomes nearly zero. The pressure increasing rate is set to become large for a predetermined period of time $\Delta T$ immediately after the braking.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
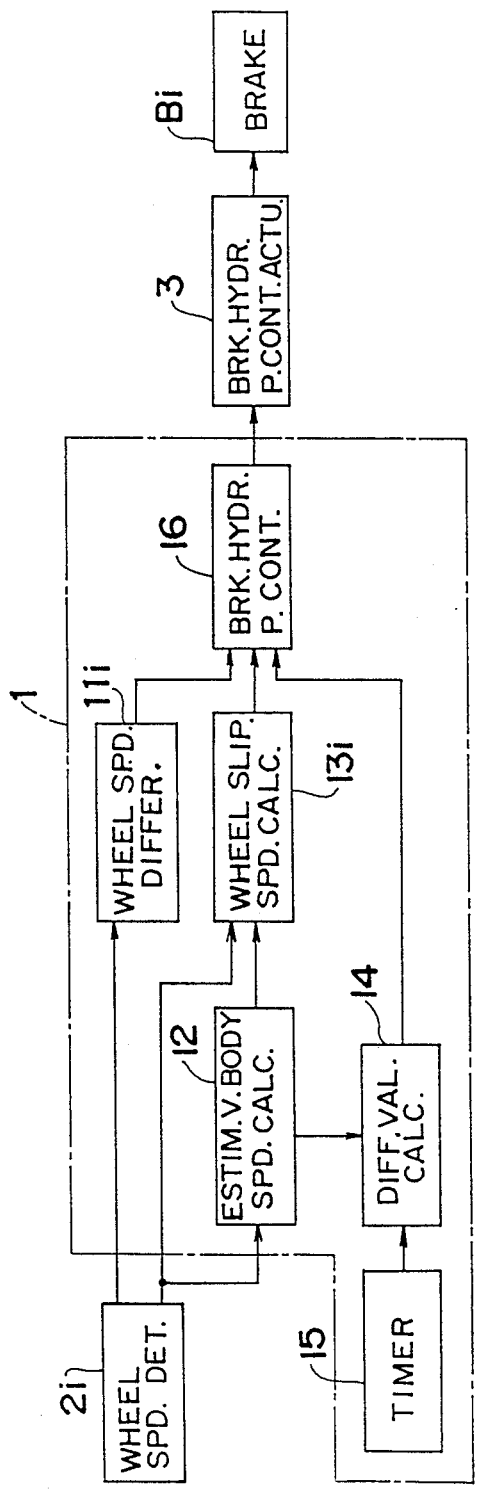
FIG. 1 is a block diagram showing general construction of a wheel speed control arrangement according to one preferred embodiment of the present invention.

Before the description of the present invention proceeds, it is to be noted that like parts are designated by like reference numerals throughout the accompanying drawings.

Referring now to the drawings, there is shown in a block diagram of FIG. 1, a wheel speed control arrangement 1 according to one preferred embodiment of the present invention, which generally includes a wheel speed differentiator 11i which receives an output Vi (wheel speed) of each wheel speed detector 2i ($i=1,\ldots,4$) so as to output its differential value (wheel speed reduction), an estimated vehicle body speed calculator 12 for calculating an estimated vehicle body speed V based on the wheel speed Vi, a wheel slip speed calculator 13i for calculating slip speed Si ($=V-Vi$) of the wheel based on the wheel speed Vi and the estimated vehicle body speed V, a difference value calculator 14 for calculating a difference value $\Delta V$ of the estimated vehicle body speed V, a timer 15, and a brake hydraulic pressure controller 16 as surrounded by chain lines and coupled to each other as illustrated. The output of the brake hydraulic pressure controller 16 is applied to a brake hydraulic pressure control actuator 3 in the form of an electromagnetic value (including a driving circuit [not shown]) or the like for raising or lowering the hydraulic pressure of each brake Bi. The brake hydraulic pressure controller 16 receives the wheel speed reduction Di, the wheel slip speed Si and the difference value $\Delta V$ of the estimated vehicle body speed V to calculate control variables, and monitors the sign of locking of the wheel and its recovery process from the locking, based on said control variables for controlling the brake hydraulic pressure control actuator 3.

Subsequently, functionings of the wheel speed control arrangement 1 of the present invention as described so far will be explained with respect to a case where the vehicle runs on a road easy to cause slippage (FIG. 2(a)), and another case where it runs on a road difficult to cause slippage (FIG. 2(b)) taken as examples.

Figure 2:
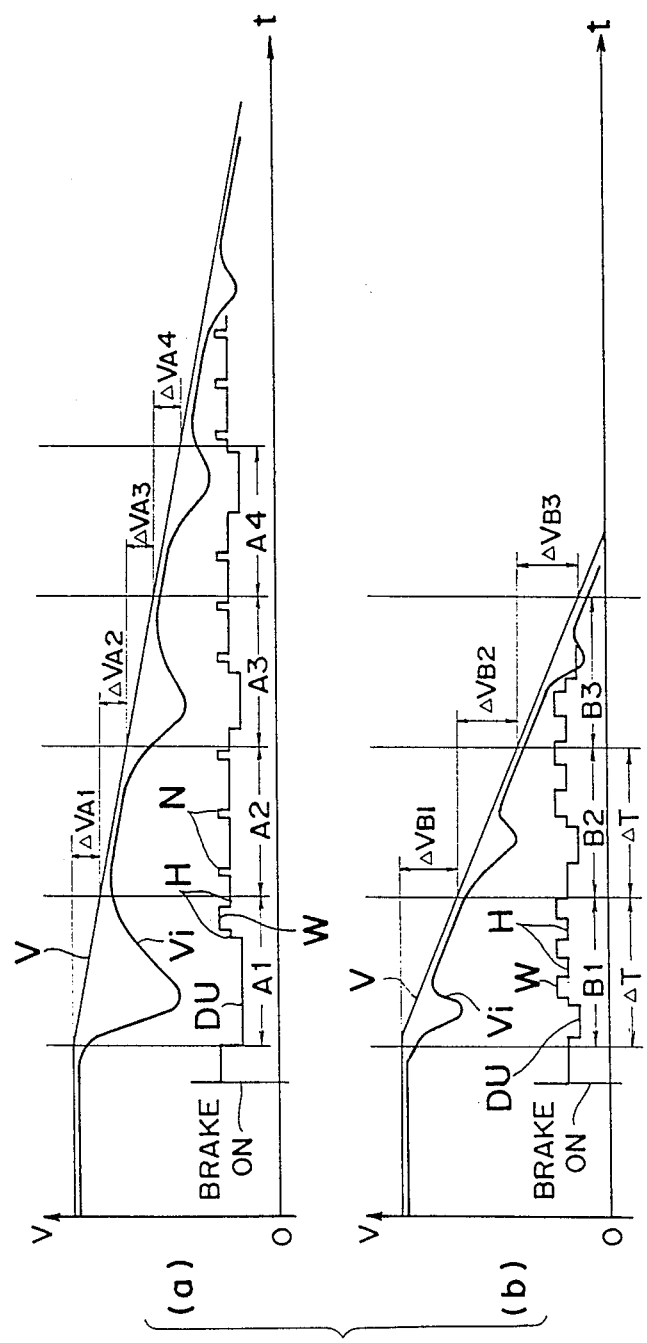
FIGS. 2(a) and 2(b) are graphical diagrams for explaining functionings of the arrangement of FIG. 1.

In the first place, after turning ON the brake, upon detection of the sign of locking of the wheel from the wheel slip speed Si, the brake hydraulic pressure controller 16 applies the pressure reducing instruction (indicated by a symbol DU in FIGS. 2(a) and 2(b)) to the brake hydraulic pressure control actuator 3 at the starting of sections A1 and B1 (time $\Delta T$). By this pressure reduction, the wheel speed Vi approaches the estimated vehicle body speed V, and upon detection of the recovery from the sign of locking, the brake hydraulic pressure controller 16 emits the pressure increasing instruction mixed with a brake hydraulic pressure holding instruction (indicated by a symbol H) so as to reduce the braking distance as far as possible. In this case, at the initial sections A1 and B1, since the difference value $\Delta V$ of the estimated vehicle body speed during the brake ON period immediately therebefore is almost zero and not definitely determined, an instruction for a large pressure application (with a large pressure increasing rate, indicated by a symbol W) is applied to the brake hydraulic pressure control actuator 3 both for the road easy to cause slippage (FIG. 2(a)) and the road difficult to cause slippage (FIG. 2(b)).

In the next place, in the case of the road easy to cause slippage as shown in FIG. 2(a), since the difference value $\Delta VA1$ of the estimated vehicle body speed at the section A1 is small, the brake hydraulic pressure controller 16 emits the instruction for a small pressure application (with a small pressure increasing rate, indicated by a symbol N) upon judgement that the pressure application is required at the next section A2. In the subsequent sections A3, A4, . . . and so forth also, the brake hydraulic pressure controller 16 emits the instruction N for the small pressure application in the similar manner as above, upon judgement that the pressure application is required, while checking for the necessity of pressure application, holding and pressure reduction. As a result, on the road easy to cause slippage, deterioration in the feeling of the riding may be effectively prevented as compared with the case where a large pressure increasing rate is fixedly employed, while avoiding the locking of wheels during the braking.

On the other hand, during running on the road difficult to slippage as in FIG. 2(b), since the difference value $\Delta VB1$ of the estimated vehicle body speed in the section B1 is larger before input from the difference value calculator 14, the brake hydraulic pressure controller 16 emits the instruction W for the large pressure application to the brake hydraulic pressure control actuator 3, upon judgement that the pressure application is necessary during the judgement for the pressure application and hydraulic pressure holding, on and after the next sections B2 and B3. In the manner as described above, on the road difficult to cause slippage, insufficient speed reduction is eliminated by increasing the pressure increasing rate based on the detection of the large difference value of the estimated vehicle body speed, and thus, the shortest braking distance may be achieved while avoiding the locking of wheels.

Figure 3:
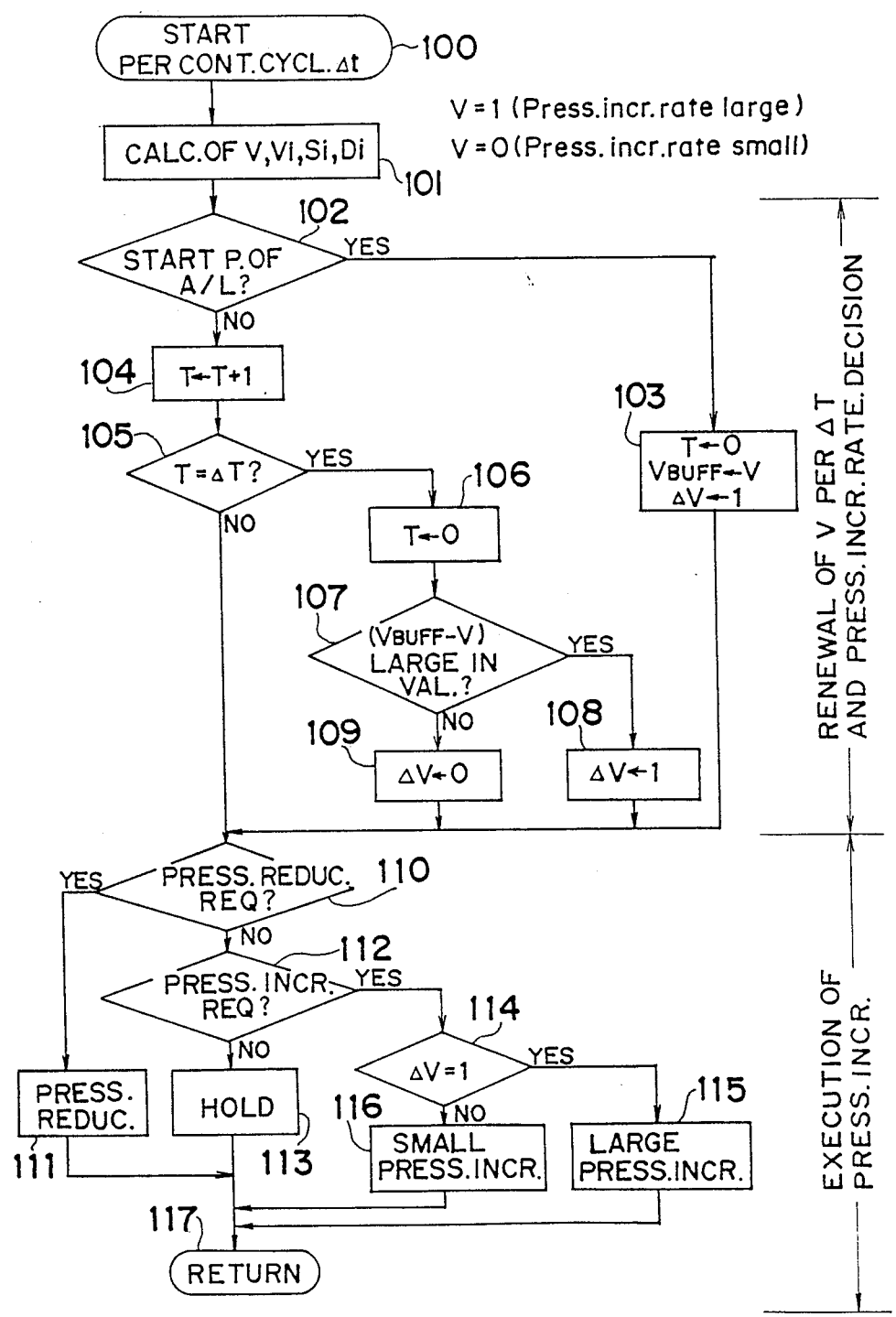
FIG. 3 is a flow-chart representing one example of a program for executing the wheel speed control arrangement of the present invention by a microcomputer.

The control functions by the wheel speed control arrangement 1 as described above may be executed through employment of a program for a flow-chart shown, for example, in FIG. 3 by means of a microcomputer in the manner as explained hereinafter.

Each time when the control cycle (time $\Delta t$) is started (step 100), the microcomputer computes the estimated vehicle body speed V, wheel speed Vi, wheel slip speed Si, and wheel speed reduction Di (step 101) and at step 102, checks whether or not it is the starting point of anti-lock A/L. Upon judgement that it is the starting point of the anti-lock control, the microcomputer resets the timer 15 at step 103, and causes the value of the estimated vehicle body speed V at that time, to be stored in a buffer memory $V_{BUFF}$ for the estimated vehicle body speed, and then, sets the difference value $\Delta V$ of the estimated vehicle body speed at $\Delta V=1$ for instructing the large pressure application (large pressure increasing rate) so as to proceed to the judgement at step 110.

In the judgement at step 102 referring to above, if it is not the starting point of the anti-lock control, the timer 15 is incremented (step 104) to proceed to the judgement at step 105. At step 105, judgement is made as to whether or not the count value T of the timer 15 has reached ΔT, and if it is not in the relation T=ΔT, the procedure proceeds to the judgement at step 110. Moreover, at the moment when the relation has reached T=ΔT at step 105, the timer 15 is reset (step 106), and at step 107, it is checked whether the difference value ΔV of the estimated vehicle body speed is large or small. If the value ΔV is large, it is judged that the road is difficult to cause slippage, and the value ΔV is set at ΔV=1 for instructing the large pressure increasing rate for the large pressure application (step 108). Meanwhile, if the difference value ΔV of the estimated vehicle body speed is small, the road is judged to easily cause slippage, and the value ΔV is set at ΔV=0 for instructing the small pressure increasing rate for the small pressure application (step 109) so as to proceed to the judgement at step 110. In the steps as described so far, the estimated vehicle body speed V is renewed for each ΔT to determine the pressure increasing rate.

Subsequently, at step 110, judgement is made as to whether or not the pressure reduction is required, and if it is necessary, a pressure reduction instruction is emitted to return to the starting point of the control cycle (steps 111, 117). On the contrary, if the pressure reduction is found to be unnecessary, judgement is made at step 112 as to whether or not the pressure increase is required, and if such pressure increase is found to be unnecessary, a holding instruction is emitted to return to the starting point of the control cycle (steps 113, 117).

On the contrary, when the pressure increase is necessary, it is judged at step 114 which of the relations ΔV=) or ΔV=1 is set at the earlier described steps (steps 108, 109), and if the setting is ΔV=0, the small pressure application is effected (step 116), while if the setting is ΔV=1, the large pressure application is made (step 115) so as to return to the starting point of the control cycle. More specifically, upon judgement that the pressure increase is necessary, the microcomputer gives instructions to the brake hydraulic pressure control actuator 3 (FIG. 1) as to which of the large pressure application or the small pressure application should be effected according to the large or small difference value ΔV of the estimated vehicle body speed.

It should be noted here that, in the foregoing embodiment, although the pressure increasing rate is set to be two kinds in large and small degrees, it will be apparent to those skilled in the art that such rate is not limited to be in two kinds, but may be increased to more than three kinds, e.g., in large, medium, and small degrees, according to the difference values of the estimated vehicle body speed, depending on necessity.

As is clear from the foregoing description, according to the wheel speed control arrangement of the present invention, since it is arranged to vary the pressure increasing rate according to the difference values of the estimated vehicle body speed when the pressure application is required, it becomes possible to effectively prevent the deterioration in the feeling of riding during braking on the road liable to cause slippage, while advantageously avoiding the locking of wheels. On the other hand, on the road surface difficult to cause slippage, insufficient speed reduction is positively eliminated, thus enabling the braking distance to be suppressed to the minimum.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In a wheel speed control arrangement which comprises an estimated vehicle body speed calculator for calculating an estimated vehicle body speed V based on an output Vi of a wheel speed detector for detecting speed of each wheel, a wheel speed differentiator which generates a differential output Di of the output Vi of said wheel speed detector, a wheel slip speed calculator which calculates a slip speed Si of each wheel based on the output V of said estimated vehicle body speed calculator and the output Vi of said wheel speed detector for output, and a brake hydraulic pressure controller which calculates control variables through input of the output Di of said wheel speed differentiator and the output Si of said wheel slip speed calculator so as to control brake hydraulic pressures of the respective wheels through a brake hydraulic pressure control actuator based on results of said calculation, the improvement comprising a difference value calculator for calculating difference values ΔV of said estimated vehicle body speed V, said difference values ΔV being arranged to be applied to said brake hydraulic pressure controller for the calculation of said control variables.

2. A wheel speed control arrangement as claimed in claim 1, wherein pressure increasing rate of said brake hydraulic pressure control actuator is set to be two kinds in large and small degrees according to the difference values ΔV of the estimated vehicle body speed V.

3. A wheel speed control arrangement as claimed in claim 1, wherein pressure increasing rate of said brake hydraulic pressure control actuator is set to be more than three kinds in large, medium and small degrees according to the difference values ΔV of the estimated vehicle body speed V.

* * * * *